United States Patent
Simons

(10) Patent No.: US 6,620,360 B1
(45) Date of Patent: Sep. 16, 2003

(54) PROCESS FOR PRODUCING MULTILAYERED MICROPARTICLES

(75) Inventor: Rolf Simons, Nottuln (DE)

(73) Assignee: Simons Druck & Vertrieb GmbH, Nottuln (DE)

( * ) Notice: Subject to any disclaimer, the term of this patent is extended or adjusted under 35 U.S.C. 154(b) by 0 days.

(21) Appl. No.: 08/981,064

(22) PCT Filed: Apr. 9, 1997

(86) PCT No.: PCT/EP97/01762
§ 371 (c)(1),
(2), (4) Date: Feb. 23, 1998

(87) PCT Pub. No.: WO97/38409
PCT Pub. Date: Oct. 16, 1997

(30) Foreign Application Priority Data

Apr. 10, 1996 (DE) .......................... 196 14 174

(51) Int. Cl.⁷ .............................. B29C 67/00
(52) U.S. Cl. ................... 264/132; 264/140; 264/232; 264/334; 427/8
(58) Field of Search ................. 264/140, 132, 264/334, 232; 252/408.1, 965; 427/7, 8

(56) References Cited

U.S. PATENT DOCUMENTS

| 3,985,602 | A | * | 10/1976 | Stuart | ........................ 156/235 |
| 4,053,433 | A | * | 10/1977 | Lee | ........................ 252/408.1 |
| 4,131,064 | A | * | 12/1978 | Ryan et al. | ............... 252/408.1 |
| 4,390,452 | A | | 6/1983 | Stevens | |
| 4,606,927 | A | | 8/1986 | Jones | |
| 4,640,035 | A | * | 2/1987 | Kind et al. | .................. 252/965 |
| 5,118,369 | A | | 6/1992 | Shamir | |
| 5,637,169 | A | * | 6/1997 | Hull et al. | ................... 264/152 |
| 5,798,147 | A | * | 8/1998 | Beck et al. | ................. 427/511 |
| 5,830,542 | A | * | 11/1998 | Shigeno et al. | ................ 428/1 |
| 5,974,974 | A | * | 11/1999 | Agnew et al. | ........... 101/401.1 |

FOREIGN PATENT DOCUMENTS

| DE | 26 07 014 A1 | | 10/1976 |
| DE | 26 51 528 A1 | | 5/1977 |
| GB | 1568699 | * | 6/1980 |
| WO | WO 96/02597 | * | 2/1996 |

* cited by examiner

Primary Examiner—Edmund H. Lee
(74) Attorney, Agent, or Firm—Sonnenschein Nath & Rosenthal

(57) ABSTRACT

A process for producing multilayered microparticles for marking and later identifying substances or objects of any desired type, even animals and plants, has the following steps: several marking layers are successively applied in the liquid state onto a web-shaped or sheet-shaped substrate, each layer being dried and/or hardened before the next marking layer is applied, until a stack of layers of the desired type and in the desired order is obtained; the substrate is separated from the stack of layers; and the stack of layers is crushed into multilayered microparticles without affecting the integrity of the series of marking layers. A first disclosed process is characterized in that the individual marking layers are applied by a printing process. Alternative processes are characterized in that the individual marking layers are applied by bronzing, by spray painting or by roll coating.

60 Claims, No Drawings

PROCESS FOR PRODUCING MULTILAYERED MICROPARTICLES

BACKGROUND OF THE INVENTION

The present invention relates to a process for producing multilayered microparticles for marking and later identifying substances or objects of any desired type, even animals and plants, comprising the following process steps:

several marking layers are successively applied each in the liquid state onto a web-shaped or sheet-shaped substrate, each layer being dried and/or hardened before the next layer is applied, until a stack of layers of the desired type and in the desired order of the marking layers is obtained, the substrate is separated from the stack of layers, and the stack of layers is crushed into the multilayered particles without affecting the integrity of the complete series of the marking layers.

A process of the kind mentioned is known from GB-PS 1 568 699. In this known process according to the state of the art, common coating technology is used for applying the individual marking layers in the liquid state wherein for a preferred thickness of each marking layer a thickness of between about 5 and 50 $\mu$m is disclosed. Foils, preferably Polyester foils, are disclosed as a substrate for the marking layers during the production of the layer stack. A wire-wound rod is used for coating the substrate with the individual marking layers in the liquid state. This wire-wound rod comprises a surface in form of a round wire wound around the outer circumference of the rod whereby a surface of the wire-wound rod is attained which as seen in a section is formed by a sequence of convex semi-circles. When this wire-wound rod is rolled on a plane substrate, the marking layer is applied on the substance or a marking layer which has been applied before and dried or hardened, which process is attained by the remaining intermediate spaces between the convex semi-circles on the one side and the substrate on the other side. By the surface tension within the marking layer which is still liquid, the thickness thereof becomes continuous and gets a substantial uniform dimension. To attain this continuous dimension of the layer thickness a relatively large thickness of the layer has to be used as otherwise other forces would outweigh the forces of the surface tension such that an automatic yield of a uniform thickness of the layer would be no longer attainable. In practical experience the marking layers applied in the liquid state comprise a thickness of about 25 $\mu$m; after drying a thickness of the layer will remain which may decrease down to about 5 $\mu$m wherein this value would be only attainable under laboratory conditions; in practical experience up to now no microparticles with a thickness of the layer below 8 $\mu$m have been found. With common coating processes used up to now for the production of microparticles no thinner layer thicknesses of the marking layers are to be produced.

A further process of the kind mentioned before is known from U.S. Pat. No. 4,390,452. The process disclosed therein in the coating technology thereof corresponds with the process of the document mentioned above; the thicknesses of the layers of the marking layers in the examples shown in the US-PS are not smaller then 15 $\mu$m per individual marking layer.

In the German published application DE 26 07 014 C2, a further process for the production of multilayered microparticles for the purpose mentioned above is described. In this process microparticles are produced according to a double peeling process. At first individual coloured plastic foils are stacked onto each other in the desired sequence, wherein the thickness of each foil is between about 12 and 200 $\mu$m. Discs with a center aperture are cut out of each foil stack with the discs stacked on a thorn. This stack is heated to melt the foil layers with each other and to deform the material to the form of a rod which is peeled to form a strip. Again, discs with a center aperture are cut from this peeled strip which are again stacked on a thorn. Also, this stack is heated to melt the discs to form a rod which again is peeled to form a strip. This strip produced in the last step is put into a solvent, which selectively dissolves the substrate material layers which earlier have been integrated in the strip. In this way the individual microparticles are produced. It is obvious that this process takes much effort and is complicated and therefore has only a limited economy.

The processes according to the state of the art explained further above are substantially more economical, however, also in this case the productivity at the production is restricted and there is room for improvement. Furthermore all known production processes have the disadvantage that they are restricted to relatively large values regarding the minimal thicknesses of the individual marking layers to be produced, and therefore also regarding the total thickness of the multilayered microparticles. Applications for such microparticles are restricted for that reason alone because the microparticles are too large when manufactured to prior art. A further disadvantage of the known microparticles is that the heat resistance thereof is restricted to about 300° C. whereby also many fields of applications are excluded where the identified substances or objects are subject to high temperatures.

It is therefore the object of the present invention to provide processes of the kind mentioned before which avoid the cited disadvantages, and by means of which microparticles with a smaller thickness of layers of the individual marking layers, and thereby also with a smaller total thickness, may be produced with a high economy without restricting the number of coding possibilities. Additionally the possibility is to be provided to produce microparticles with an improved heat resistance.

The first solution of the above object is attained in that the individual marking layers are applied in a printing process. Suitable printing processes, e.g., are the letter printing process, the rotogravure printing process, the flatbed printing process or screen printing processes with screens or templates.

In an embodiment of the process according to the invention it is proposed that each marking layer is applied in the pasty state instead of the liquid state. Applying the marking layers in the pasty state is easily possible with the printing processes mentioned above, in particular with the screen printing process. Advantageously it is possible to use absolutely new materials for the marking layers which are not available in the liquid state.

A preferred further development in this respect provides that each marking layer is applied in the thixotrope state. Hereby in particular the handling and processing of substances is simplified which are used for the marking layers. In order to enable the production of microparticles in particular with a higher resistance and/or higher chemical durability, it is furthermore proposed that glass powder and/or enamel powder with added heat-resistant colouring bodies is used as a base substance for the marking layers, and this base substance prior to its application is transferred into the pasty state by adding transfer lacquer or printing oil. By means of a selected heat treatment, microparticles are to be produced from this base substance whose individual marking layers are homogenous and stable as such and which at the same time have a firm coherence in the stack of layers.

A further process according to the invention which is also particularly suitable for the production of microparticles with higher heat resistance and/or higher chemical durability, is characterized in that each marking layer is applied in the dry state in the form of a powder instead of the liquid state by a bronzing process. This alternate solution of the object mentioned above advantageously enables the use of dry powders for the production of marking layers whereby further materials for the production of microparticles may be used which may not be produced or processed in a liquid or pasty state.

In a further embodiment of the above described process, advantageously glass powder and/or enamel powder with added heat-resistant colouring bodies is used as the base substance for the marking layers. In this way, particularly heat resistant microparticles may be produced which are especially well suitable for the marking of explosives or igniters for explosives.

A further alternate solution for the objective is attained in that the individual marking layers are applied by a spray painting process.

A fourth solution of the object is attained in that the individual marking layers are applied by a roll coating process.

DETAILED DESCRIPTION OF THE PREFERRED EMBODIMENT

Up to now it was the experts unanimous opinion, that the individual marking layers for forming the stack of layers for the microparticles could be produced only by coating by means of coating rollers using liquid base materials. It was a surprise for the experts that the processes according to the invention are suitable to produce the stack of layers out of a sequence of marking layers to produce the microparticles in the desired quality and reproducebility. Furthermore, the processes according to the invention yield a more economical production because they are substantially faster than processes using rollers for the coating process. It is a further advantage that a smaller, however, still uniform thickness of the individual marking layers is possible enabling the production of, in total, smaller microparticles without restrictions of the durability and strength thereof and without restricting the number of coding possibilities. Furthermore, advantageously within the process according to the invention, for applying the individual marking layers in the liquid state, materials may be used which according to the state of the art in the documents cited are known as such. Only regarding the viscosity of the liquid materials for producing the marking layers and/or regarding the fineness of the colouring bodies used, a certain selection or adaption is required, however, the expert in the field of printing and lacquering processes mentioned regarding the invention knows these means. At the same time the process according to the invention offers the possibility to apply the marking layers in a pasty or even dry powder-like state as is described above resulting in the use of completely new, in particular heat resistant material for the marking layers.

A further development of all processes of the kind mentioned above is characterized in that paper is used for the substrate. Such a substrate is very inexpensive and contributes to a good economy of the process.

It is furthermore proposed in this process that the substrate is separated from the stack of layers in a liquid bath wherein the substrate is softened and/or dissolved. In the simplest case, the liquid bath may be a water bath to which possibly substances are added which accelerate the softening and/or dissolving of the substrate.

Finally, it is proposed that the stack of layers separated from the substrate prior to its crushing is dried and/or hardened and/or after-baked, wherein also the drying and hardening is preferably accomplished by heat. This step of drying and/or hardening and/or after-baking is useful to add positive mechanical features to the individual microparticles of the individual layers and to the stack of layers for the subsequent crushing prior to crushing the stack of layers. In particular, a relative high brittleness and at the same time a good stability and firm coherence of the layers is attained. The crushing of the stack of layers may be attained in suitable mills, i.e., ball mills which are known as such. The crushing for practical reasons is only carried so far that within the overwhelming number of the yielded microparticles, the full marking layer sequence is contained to enable the identification of the substances or objects marked with the microparticles without an error. After the crushing process, additionally, a sorting of the microparticles is provided wherein all those microparticles are sorted out which no longer have the full sequence of marking layers in order to exclude them from further use for identification purposes.

With the processes according to the invention it is possible to produce substantially smaller microparticles in relation to the state of the art which may have thicknesses of layers of the individual marking layers down to 1 $\mu$m, and/or of substantially more heat resistant microparticles which leads to an application of microparticles for the identification of substances or objects which was not possible hitherto. As an example, it is possible to mark special papers for the production of bank notes or stocks or objects in general having only a very small thickness as such wherein for this reason only very small microparticles may be integrated without impairing the quality features of the marked objects.

Furthermore it is possible to mark substances or objects which are subject to high temperatures during their use or handling. As an example, marking fibers are quoted which are produced with microparticles as an integral part and preferably are used and suitable for marking cloth, textiles, and labels, leading to an improved counteraction to counterfeit products which are wide spread in this field.

The individual marking layers preferably differ in their optical features, in first line in their colours wherein the layers or individual layers may have fluorescent or noctilucent features. They may also differ by various magnetic features. Furthermore, magnetizing may simplify the later retrieval and/or separation of microparticles.

The later identification and decoding of the microparticles is also possible with the smaller thicknesses of layers up to a minimal 1 $\mu$m according to the invention, e.g., with suitable optical magnifying devices and/or magnetic measuring devices such that the miniaturization does not restrict the identification of the marking layers of the microparticles in practical operation.

What is claimed is:

1. A process of producing multilayered microparticles for marking and later identifying substances or objects, comprising the steps of:

successively applying several thin and visually dissimilar marking layers, onto a flat substrate, each thin and visually dissimilar marking layer solidifying to a thickness of 1 micrometer before a next layer is applied, until a stack of layers in a desired order of the marking layers is obtained, separating the substrate from the stack of layers, and comminuting the stack of layers into multilayered particles without affecting an integrity of a complete series of the marking layers, wherein the step of successively applying is accomplished in a printing process.

2. A process according to claim 1, wherein said printing process step comprises a letterpress printing process.

3. A process according to claim 1, wherein said printing process step comprises a rotogravure printing process.

4. A process according to claim 1, wherein said printing process step comprises a flatbed printing process.

5. A process according to claim 1, wherein said printing process step comprises a screen printing process.

6. A process according to claim 1, wherein each of said marking layers is applied in a thixotrope state.

7. A process according to claim 1, wherein paper is used for the substrate and wherein the substrate is separated from the stack of layers in a liquid bath.

8. A process according to claim 7, wherein the substrate is separated from the stack of layers in a liquid bath wherein the substrate is softened.

9. A process according to claim 8, wherein the substrate is dissolved.

10. A process according to claim 8, including the step of drying the stack of layers prior to comminuting the stack of layers.

11. A process according to claim 8, including the step of hardening the stack of layers prior to comminuting the stack of layers.

12. A process according to claim 8, including the step of after-baking the stack of layers prior to comminuting the stack of layers.

13. A process of producing multilayered microparticles for marking and later identifying substances or objects, comprising the steps:

successively applying several thin and visually dissimilar marking layers, onto a flat substrate, each thin and visually dissimilar marking layer solidifying to a thickness of less than 4.5 micrometers before a next layer is applied, until a stack of layers in a desired order of the marking layers is obtained, separating the substrate from the stack of layers, and comminuting the stack of layers into multilayered particles without affecting an integrity of a complete series of the marking layers, wherein the step of successively applying is accomplished in a printing process.

14. A process according to claim 13, wherein said printing process step comprises a letterpress printing process.

15. A process according to claim 13, wherein said printing process step comprises a rotogravure printing process.

16. A process according to claim 13, wherein said printing process step comprises a flatbed printing process.

17. A process according to claim 13, wherein said printing process step comprises a screen printing process.

18. A process according to claim 13, wherein each of said marking layers is applied in a thixotrope state.

19. A process according to claim 13, wherein paper is used for the substrate and wherein the substrate is separated from the stack of layers in a liquid bath.

20. A process according to claim 19, wherein the substrate is separated from the stack of layers in a liquid bath wherein the substrate is softened.

21. A process according to claim 20, wherein the substrate is dissolved.

22. A process according to claim 20, including the step of drying the stack of layers prior to comminuting the stack of layers.

23. A process according to claim 20, including the step of hardening the stack of layers prior to comminuting the stack of layers.

24. A process according to claim 20, including the step of after-baking the stack of layers prior to comminuting the stack of layers.

25. A process of producing multilayered microparticles for marking and later identifying substances or objects, comprising the steps:

successively applying several thin and visually dissimilar marking layers, onto a flat substrate, each thin and visually dissimilar marking layer solidifying to a thickness of less than 4.5 micrometers and down to 1 micrometer before a next layer is applied, until a stack of layers in a desired order of the marking layers is obtained, separating the substrate from the stack of layers, and comminuting the stack of layers into multilayered particles without affecting an integrity of a complete series of the marking layers, wherein the step of successively applying is accomplished in a printing process.

26. A process according to claim 25, wherein said printing process step comprises a letterpress printing process.

27. A process according to claim 25, wherein said printing process step comprises a rotogravure printing process.

28. A process according to claim 25, wherein said printing process step comprises a flatbed printing process.

29. A process according to claim 25, wherein said printing process step comprises a screen printing process.

30. A process according to claim 25, wherein each of said marking layers is applied in a thixotrope state.

31. A process according to claim 25, wherein paper is used for the substrate and wherein the substrate is separated from the stack of layers in a liquid bath.

32. A process according to claim 31, wherein the substrate is separated from the stack of layers in a liquid bath wherein the substrate is softened.

33. A process according to claim 32, wherein the substrate is dissolved.

34. A process according to claim 32, including the step of drying the stack of layers prior to comminuting the stack of layers.

35. A process according to claim 32, including the step of hardening the stack of layers prior to comminuting the stack of layers.

36. A process according to claim 32, including the step of after-baking the stack of layers prior to comminuting the stack of layers.

37. A process of producing multilayered microparticles for marking and later identifying substances or objects, comprising the steps:

successively applying several thin and visually dissimilar marking layers, onto a flat substrate, each thin and visually dissimilar marking layer solidifying to a thickness of less than 4 micrometers before a next layer is applied, until a stack of layers in a desired order of the marking layers is obtained, separating the substrate from the stack of layers, and comminuting the stack of layers into multilayered particles without affecting an integrity of a complete series of the marking layers, wherein the step of successively applying is accomplished in a printing process.

38. A process according to claim 37, wherein said printing process step comprises a letterpress printing process.

39. A process according to claim 37, wherein said printing process step comprises a rotogravure printing process.

40. A process according to claim 37, wherein said printing process step comprises a flatbed printing process.

41. A process according to claim 37, wherein said printing process step comprises a screen printing process.

42. A process according to claim 37, wherein each of said marking layers is applied in a thixotrope state.

43. A process according to claim 37, wherein paper is used for the substrate and wherein the substrate is separated from the stack of layers in a liquid bath.

44. A process according to claim 40, wherein the substrate is separated from the stack of layers in a liquid bath wherein the substrate is softened.

45. A process according to claim 44, wherein the substrate is dissolved.

46. A process according to claim 44, including the step of drying the stack of layers prior to comminuting the stack of layers.

47. A process according to claim 44, including the step of hardening the stack of layers prior to comminuting the stack of layers.

48. A process according to claim 44, including the step of after-baking the stack of layers prior to comminuting the stack of layers.

49. A process of producing multilayered microparticles for marking and later identifying substances or objects, comprising the steps:

successively applying several thin and visually dissimilar marking layers, onto a flat substrate, each thin and visually dissimilar marking layer solidifying to a thickness of less than 3 micrometers and down to 1 micrometer before a next layer is applied, until a stack of layers in a desired order of the marking layers is obtained, separating the substrate from the stack of layers, and comminuting the stack of layers into multilayered particles without affecting an integrity of a complete series of the marking layers, wherein the step of successively applying is accomplished in a printing process.

50. A process according to claim 49, wherein said printing process step comprises a letterpress printing process.

51. A process according to claim 49, wherein said printing process step comprises a rotogravure printing process.

52. A process according to claim 49, wherein said printing process step comprises a flatbed printing process.

53. A process according to claim 49, wherein said printing process step comprises a screen printing process.

54. A process according to claim 49, wherein each of said marking layers is applied in a thixotrope state.

55. A process according to claim 49, wherein paper is used for the substrate and wherein the substrate is separated from the stack of layers in a liquid bath.

56. A process according to claim 55, wherein the substrate is separated from the stack of layers in a liquid bath wherein the substrate is softened.

57. A process according to claim 56, wherein the substrate is dissolved.

58. A process according to claim 56, including the step of drying the stack of layers prior to comminuting the stack of layers.

59. A process according to claim 56, including the step of hardening the stack of layers prior to comminuting the stack of layers.

60. A process according to claim 56, including the step of after-baking the stack of layers prior to comminuting the stack of layers.

* * * * *